No. 769,361. PATENTED SEPT. 6, 1904.
J. S. STEVENS.
WHEEL.
APPLICATION FILED MAY 19, 1904.
NO MODEL.

WITNESSES

INVENTOR
James S. Stevens
BY Huzard & Harpham
ATTORNEYS

No. 769,361. Patented September 6, 1904.

UNITED STATES PATENT OFFICE.

JAMES S. STEVENS, OF LOS ANGELES, CALIFORNIA.

WHEEL.

SPECIFICATION forming part of Letters Patent No. 769,361, dated September 6, 1904.

Application filed May 19, 1904. Serial No. 208,746. (No model.)

*To all whom it may concern:*

Be it known that I, JAMES S. STEVENS, a citizen of the United States, residing at Los Angeles, in the county of Los Angeles and State of California, have invented new and useful Improvements in Wheels, of which the following is a specification.

My invention relates to rotating wheels which carry a superstructure; and the object thereof is to provide means to reduce the jar of the side thrust caused by turning corners quickly or from a wheel suddenly dropping into a hole or running over an obstruction. I accomplish this object by the means described herein and illustrated in the accompanying drawings, in which—

Figure 1:
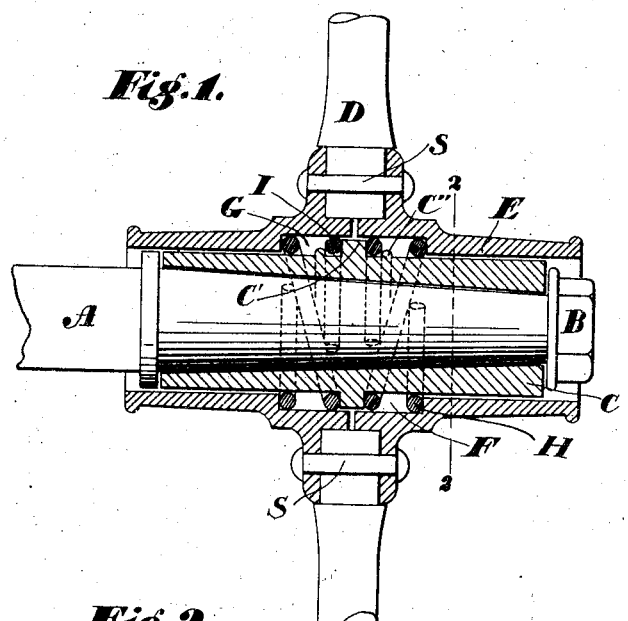
Figure 2:
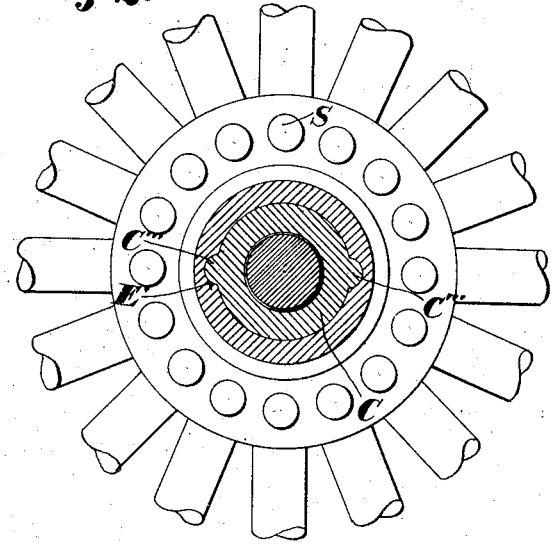

Figure 1 is a central longitudinal section of the hub of a vehicle-wheel equipped with my jar-reducing mechanism, a portion of the axle and spokes being shown in elevation. Fig. 2 is a cross-section on the line 2 2 of Fig. 1 looking toward the spokes.

In the drawings, A is the axle of the vehicle and is provided with the usual wheel-retaining nut B. Where the axle tapers, I secure a tapered bushing C upon the tapered end of the axle, which bushing is provided with an annular flange C', which is preferably located on a line with the spokes D. The outside of this bushing is preferably cylindrical. On each side of this annular flange the hub E is chambered to form spring-retaining chambers F and G, in which are mounted spiral springs H and I, which surround the bushing and reduce the jar of the side thrust caused by the wheel dropping suddenly into a chuck-hole or running over an obstruction or turning a corner rapidly. Where the end of the axle is straight, the bushing is preferably not tapered.

Lugs C''' may be provided on the bushing, which enter grooves E' in the hub to prevent the bushing from rotating in the hub. Lugs C'' may also be provided on the bushing to keep the ends of the springs in contact with the flange, and thereby prevent the springs from rattling.

By this construction the jar of the side thrust of a traveling vehicle is greatly reduced and in most cases entirely eliminated.

The hub is preferably made of malleable cast metal and is cast in two parts, which are secured together by rivets S.

Having described my invention, what I claim as new, and desire to secure by Letters Patent, is—

1. In a vehicle-wheel a hub having a central bore adapted to fit upon an axle, said hub being divided transversely in the center thereof and having an annular chamber in the center of said hub, said chamber being larger than the bore through said hub; means to secure the parts of said hub together; a bushing having a flange projecting into the annular chamber of the hub; spiral springs on said bushing in said annular chamber one on each side of the flange thereof.

2. In a vehicle-wheel the herein-described hub E having the annular chamber G therein, bushing C having flange C', said flange projecting into chamber G and dividing the same into two parts; springs H on said bushing in said chamber one on each side of said flange.

3. The herein-described vehicle-wheel having hub H transversely divided in the center thereof and having annular chamber G in the center thereof; rivets S securing the parts of said hub together, bushing C having a central annular flange projecting into said chamber G and dividing the same into two parts; spiral springs H surrounding said bushing and lying in said chamber G; lugs C'' adjacent to flange C' and adapted to secure one end of the springs H in contact with said flange C'; lugs C''' on the outer side of said bushing, said hub having a groove therein for the reception of said last-named lugs.

In witness that I claim the foregoing I have hereunto subscribed my name this 13th day of May, 1904.

JAS. S. STEVENS.

Witnesses:
G. E. HARPHAM,
MARGARETE C. NICKELESON.